United States Patent
Gorski et al.

(10) Patent No.: US 12,450,941 B2
(45) Date of Patent: Oct. 21, 2025

(54) SYSTEMS AND METHODS FOR MANAGING OCCUPANT INTERACTION USING DEPTH INFORMATION

(71) Applicant: Ford Global Technologies, LLC, Dearborn, MI (US)

(72) Inventors: Ryan Joseph Gorski, Grosse Pointe Farms, MI (US); John Robert Van Wiemeersch, Novi, MI (US); Mahmoud Yousef Ghannam, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 431 days.

(21) Appl. No.: 18/122,317

(22) Filed: Mar. 16, 2023

(65) Prior Publication Data
US 2024/0312247 A1    Sep. 19, 2024

(51) Int. Cl.
| | | |
|---|---|---|
| *G06V 40/16* | (2022.01) | |
| *G01S 17/894* | (2020.01) | |
| *G06F 3/01* | (2006.01) | |
| *G06T 7/73* | (2017.01) | |

(52) U.S. Cl.
CPC .......... *G06V 40/168* (2022.01); *G01S 17/894* (2020.01); *G06F 3/012* (2013.01); *G06F 3/013* (2013.01); *G06T 7/73* (2017.01); *G06T 2207/10028* (2013.01); *G06T 2207/30201* (2013.01)

(58) Field of Classification Search
None
See application file for complete search history.

(56) References Cited

U.S. PATENT DOCUMENTS

| | | | |
|---|---|---|---|
| 8,942,881 B2 | 1/2015 | Hobbs et al. | |
| 11,167,771 B2* | 11/2021 | Caron | G06F 3/04886 |
| 2013/0204457 A1 | 8/2013 | King et al. | |
| 2020/0073399 A1* | 3/2020 | Tateno | G05D 1/0251 |
| 2020/0394428 A1* | 12/2020 | Turcot | G06V 20/59 |
| 2021/0122242 A1* | 4/2021 | Ding | B60K 35/10 |
| 2021/0218814 A1 | 7/2021 | Tran | |
| 2021/0312684 A1* | 10/2021 | Zimmermann | A63F 13/5255 |

* cited by examiner

*Primary Examiner* — Gabriel I Garcia
(74) *Attorney, Agent, or Firm* — Frank Lollo; Price Heneveld LLP

(57) ABSTRACT

A method for managing occupant interaction with components of a vehicle includes generating, via a time-of-flight sensor, a point cloud representing a compartment of the vehicle, the point cloud including three-dimensional positional information about the compartment. The method further includes identifying at least one body segment of a user based on the point cloud. The method further includes determining, via processing circuitry in communication with the time-of-flight sensor, a position of at least one feature of the at least one body segment. The method further includes calculating an orientation of the at least one body segment based on the at least one feature. The method further includes estimating an intended task of the user based on the orientation of the at least one body segment. The method further includes generating, via the processing circuitry, a response signal in response to estimation of the intended task.

20 Claims, 10 Drawing Sheets

SYSTEMS AND METHODS FOR MANAGING OCCUPANT INTERACTION USING DEPTH INFORMATION

FIELD OF THE DISCLOSURE

The present disclosure generally relates to systems and methods for managing occupant interaction using depth information, and, more particularly, to gesture recognition for vehicle occupants using LiDAR.

BACKGROUND OF THE DISCLOSURE

Conventional monitoring techniques are typically based on visual image data. A detection system that captures depth information may enhance spatial determination.

SUMMARY OF THE DISCLOSURE

According to a first aspect of the present disclosure, a method for managing occupant interaction with components of a vehicle includes generating, via a time-of-flight sensor, a point cloud representing a compartment of the vehicle, the point cloud including three-dimensional positional information about the compartment. The method further includes identifying at least one body segment of a user based on the point cloud. The method further includes determining, via processing circuitry in communication with the time-of-flight sensor, a position of at least one feature of the at least one body segment. The method further includes calculating an orientation of the at least one body segment based on the at least one feature. The method further includes estimating an intended task of the user based on the orientation of the at least one body segment. The method further includes generating, via the processing circuitry, a response signal in response to estimation of the intended task.

Embodiments of the first aspect of the present disclosure can include any one or a combination of the following features:
  the at least one body segment includes a head, the at least one feature is a facial feature, the orientation is a tilt of the head, and the intended task is a gaze direction of the user, the method further includes calculating the tilt of the head based on the facial feature, and estimating the gaze direction based on the tilt of the head;
  identifying, based on the point cloud, eyes of the user, calculating a frontal plane based on the eyes of the user, and determining a vector normal to the frontal plane, wherein the vector corresponds to the estimation of the gaze direction;
  communicating, via the processing circuitry, a signal to align an adjustable component of the vehicle based on the estimation of the gaze direction;
  the adjustable component is configured to adjust a visual feedback element;
  the visual feedback element is a display, and the adjustable component is configured to adjust a visual presentation of the display to align the display with the estimation of the gaze direction;
  the visual feedback element is a mirror, and the adjustable component is configured to adjust an angle of the mirror to align the mirror with a target viewing angle;
  the adjustable component is configured to adjust a position of the user;
  the at least one body segment includes an appendage, the at least one feature is a longitudinal extension, the orientation is an indication direction, and the intended task is an input selection of the user, the method further includes calculating the indication direction of the appendage based on the longitudinal extension, and estimating the input selection based on the indication direction;
  predicting a system function of the vehicle to be adjusted based on the estimation of the input selection, and presenting an option to activate the system function;
  identifying, based on the point cloud, a gesture by the user, and selecting, via the processing circuitry, the option based on the gesture;
  the input selection is manipulation of a mechanical switch;
  the input selection is a digital indicator presented at a user interface for the vehicle; and
  communicating a signal to adjust a size of the digital indicator at the user interface based on the identification of the gesture.

According to a second aspect of the present disclosure, a system for managing occupant interaction with components of a vehicle includes a time-of-flight sensor configured to generate a point cloud representing a compartment of the vehicle, the point cloud including three-dimensional positional information about the compartment. The system further includes processing circuitry in communication with the time-of-flight sensor configured to identify at least one body segment of a user based on the point cloud, determine a position of at least one feature of the at least one body segment, calculate an orientation of the at least one body segment based on the at least one feature, estimate an intended task of the user based on the orientation of the at least one body segment, and generate a response signal in response to the estimation of the intended task.

Embodiments of the second aspect of the present disclosure can include any one or a combination of the following features:
  at least one body segment includes a head, the at least one feature is a facial feature, the orientation is a tilt of the head, and the intended task is a gaze direction of the user, the processing circuitry further configured to calculate the tilt of the head based on the facial feature, and estimate the gaze direction based on the tilt of the head;
  an adjustable component of the vehicle in communication with the processing circuitry, the processing circuitry further configured to communicate a signal to align the adjustable component;
  at least one body segment includes an appendage, the at least one feature is a longitudinal extension, the orientation is an indication direction, and the intended task is an input selection of the user, the processing circuitry further configured to calculate the indication direction of the appendage based on the longitudinal extension, and estimate the input selection based on the indication direction; and
  the processing circuitry is further configured to predict a system function of the vehicle to be adjusted based on the estimation of the input selection, present an option to activate the system function, identify, based on the point cloud, a gesture by the user, and select the option based on the gesture.

According to a third aspect of the present disclosure, a system for managing occupant interaction with components of a vehicle includes a time-of-flight sensor configured to generate a point cloud representing a compartment of the vehicle, the point cloud including three-dimensional positional information about the compartment. The system further includes a visual feedback element. The system further includes an adjustable component configured to adjust the visual feedback element. The system further includes processing circuitry in communication with the time-of-flight sensor and the adjustable component, the processing circuitry configured to identify a head of a user based on the point cloud, determine a position of facial features of the head, calculate a tilt of the head based on the facial features, estimate a gaze direction of the user based on the tilt, and communicate a signal to align the adjustable component based on the estimation of the gaze direction.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1A:
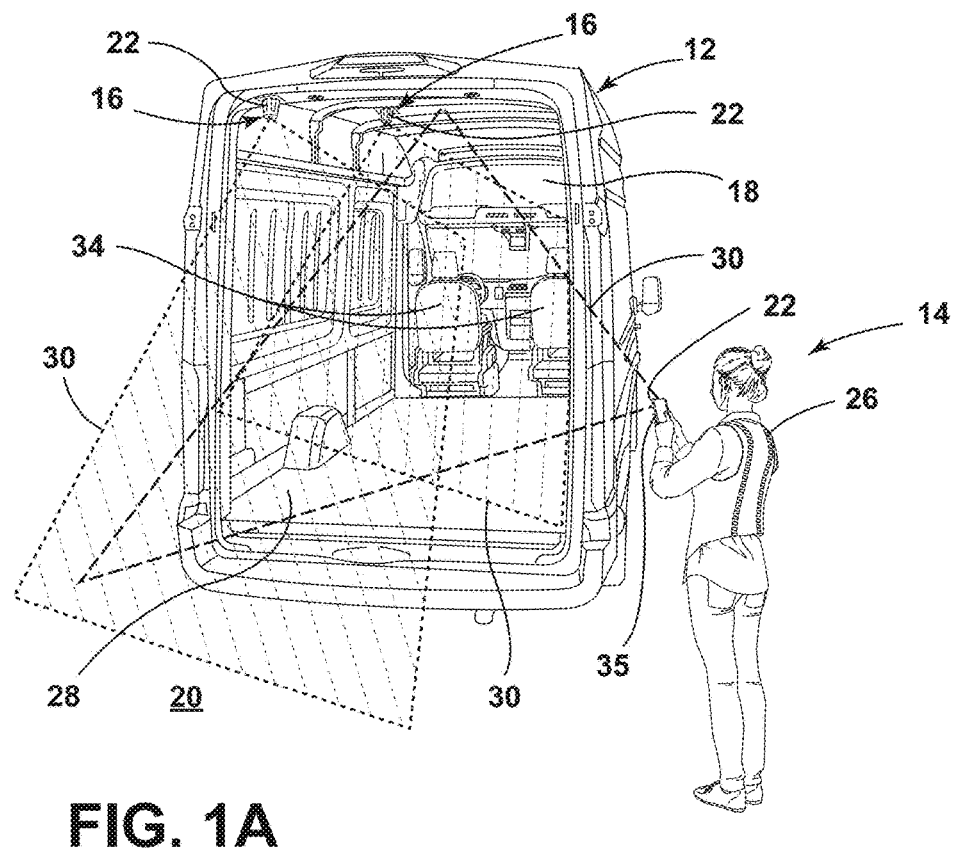
FIG. 1A is a perspective view of a cargo van incorporating a detection system of the present disclosure in a rear space of the cargo van.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements may or may not be to scale and certain components may or may not be enlarged relative to the other components for purposes of emphasis and understanding.

For purposes of description herein, the terms "upper," "lower," "right," "left," "rear," "front," "vertical," "horizontal," and derivatives thereof shall relate to the concepts as oriented in FIG. 1A. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to managing occupant interaction using depth information. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring generally to FIGS. 1A-5, the present disclosure generally relates to a detection system 10 for a vehicle 12 that utilizes three-dimensional image sensing to detect information about an environment 14 in or around the vehicle 12. The three-dimensional image sensing may be accomplished via one or more time-of-flight (ToF) sensors 16 that are configured to map a three-dimensional space such as an interior 18 of the vehicle 12 and/or a region exterior 20 to the vehicle 12. For example, the one or more time-of-flight sensors 16 may include at least one light detection and ranging (LiDAR) module 22 configured to output pulses of light, measure a time of flight for the pulses of light to return from the environment 14 to the at least one LiDAR module 22, and generate at least one point cloud 24 of the environment 14 based on the time-of-flight of the pulses of light. In this way, the LiDAR module 22 may provide information regarding three-dimensional shapes of the environment 14 being scanned, including geometries, proportions, or other measurement information related to the environment 14 and/or occupants 26 for the vehicle 12.

The LiDAR modules 22 of the present disclosure may operate conceptually similarly to a still frame or video stream, but instead of producing a flat image with contrast and color, the LiDAR module 22 may provide information regarding three-dimensional shapes of the environment 14 being scanned. Using time-of-flight, the LiDAR modules 22 are configured to measure the round-trip time taken for light to be transmitted, reflected from a surface, and received at a sensor near the transmission source. The light transmitted may be a laser pulse. The light may be sent and received millions of times per second at various angles to produce a matrix of the reflected light points. The result is a single measurement point for each transmission and reflection representing distance and a coordinate for each measurement point. When the LiDAR module 22 scans the entire "frame," or field of view 30, it generates an output known as a point cloud 24 that is a 3D representation of the features scanned.

In some examples, the LiDAR modules 22 of the present disclosure may be configured to capture the at least one point cloud 24 independent of visible-light illumination of the environment 14. For example, the LiDAR modules 22 may not require ambient light to achieve the spatial mapping techniques of the present disclosure. For example, the LiDAR module 22 may emit and receive IR or near-infrared (NIR) light, and therefore generate the at least one point cloud 24 despite visible-light conditions. Further, as compared to Radio Detection and Ranging (RADAR), the depth-mapping achieved by the LiDAR modules 22 may have greater accuracy due to the rate at which the LiDAR pulses may be emitted and received (e.g., the speed of light). Further, the three-dimensional mapping may be achieved without utilizing radio frequencies (RF), and therefore may limit RF certifications for operation. Accordingly, sensors incorporated for monitoring frequencies and magnitudes of RF fields may be omitted by providing the present LiDAR modules 22.

Figure 1B:
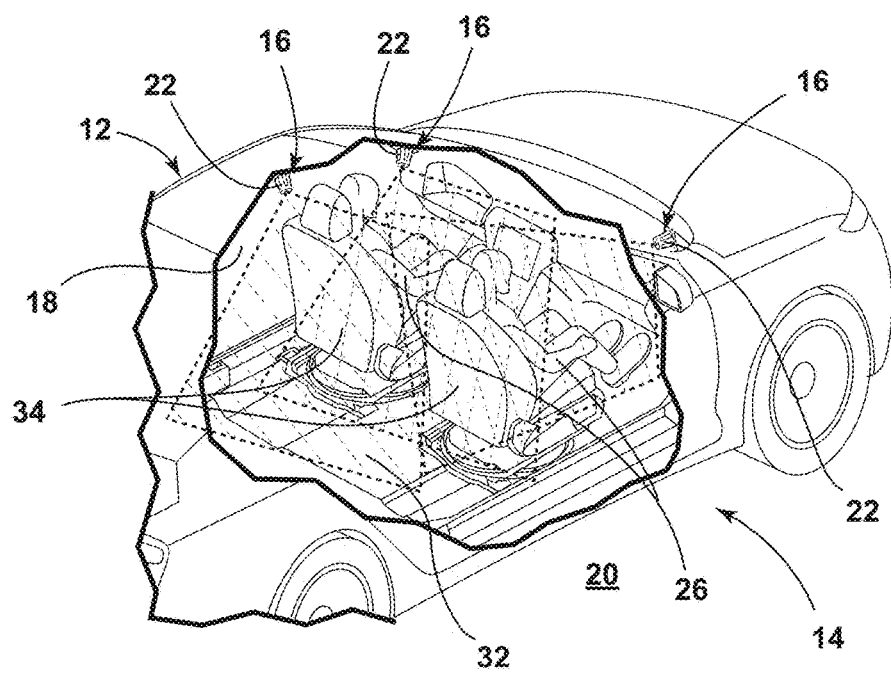
FIG. 1B is a perspective view of a car incorporating a detection system of the present disclosure in a passenger cabin of the car.

Referring now more particularly to FIGS. 1A and 1B, a plurality of the LiDAR modules 22 may be configured to monitor a compartment 28 of the vehicle 12. In the example illustrated in FIG. 1A, the LiDAR modules 22 are configured with a field of view 30 that covers the rear space of the vehicle 12, as well as the region exterior 20 to the vehicle 12. In this example, the region exterior 20 to the vehicle 12 is a space behind the vehicle 12 adjacent to an entry or an exit to the vehicle 12. In FIG. 1B, the plurality of LiDAR modules 22 are configured to monitor a front space of the vehicle 12, with the field of view 30 of one or more of the plurality of LiDAR modules 22 covering a passenger cabin 32 of the vehicle 12. As will be described further herein, it is contemplated that the plurality of LiDAR modules 22 may be in communication with one another to allow the at least one point cloud 24 captured from each LiDAR module 22 to be compared to one another to render a greater-accuracy representation of the environment 14. For example, and as depicted in FIG. 1A, the occupant 26 or another user may direct a mobile device 35 toward the environment 14 to generate an additional point cloud 24 from a viewing angle different than the field-of-views 30 of the LiDAR modules 22 of the vehicle 12. For example, the mobile device 35 may be a cellular phone having one of the LiDAR modules 22. In general, the time-of-flight sensors 16 disclosed herein may capture point clouds 24 of various features of the environment 14, such as seats 34, occupants 26, and various other surfaces or items present in the interior 18 or the region exterior 20 to the vehicle 12. As will further be discussed herein, the present system 10 may be operable to identify these features based on the at least one point cloud 24 and make determinations and/or calculations based on the identities, spatio-temporal positions of the features, and/or other related aspects of the features detected in the at least one point cloud 24.

Figure 2A:
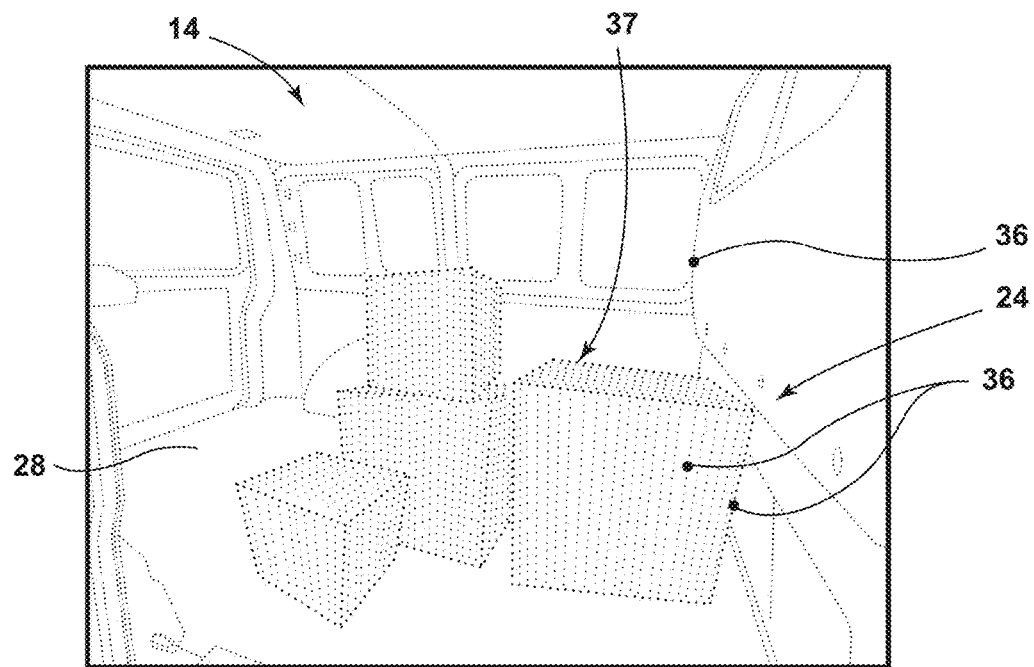
FIG. 2A is a representation of a point cloud generated by a time-of-flight sensor configured to monitor a rear space of a cargo van of the present disclosure.
Figure 2B:
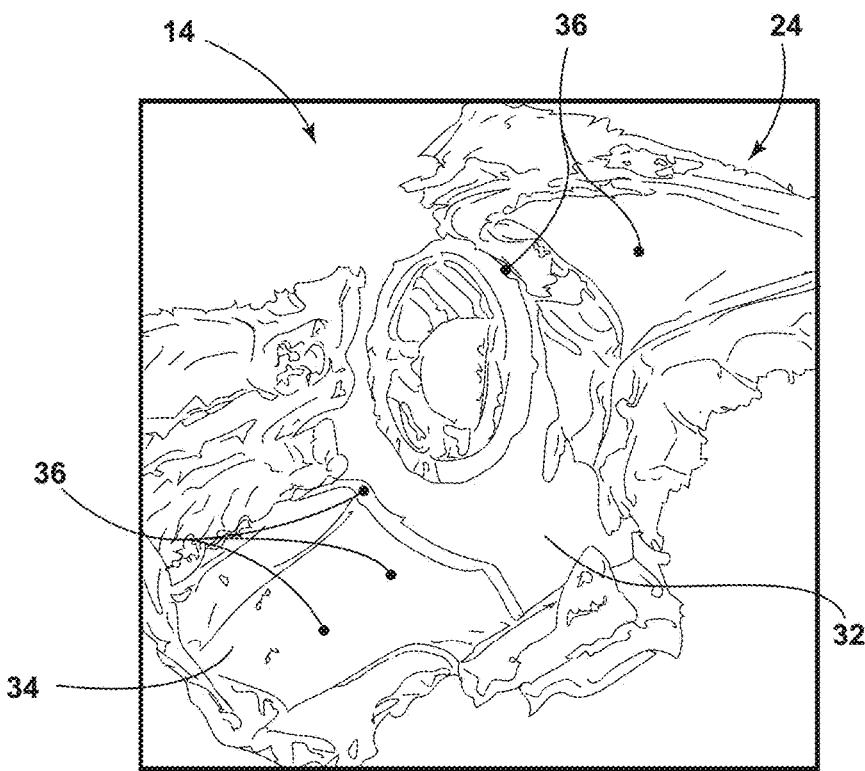
FIG. 2B is a representation of a point cloud generated by a time-of-flight sensor configured to monitor a passenger compartment of a vehicle of the present disclosure.

Referring now to FIGS. 2A and 2B, representations of at least one point cloud 24 generated from the LiDAR modules 22 in the interiors 18 of the vehicles 12 of FIGS. 1A and 1B, respectively, are presented to illustrate the three-dimensional mapping of the present system 10. For example, the depictions of the at least one point cloud 24 may be considered three-dimensional images constructed by the LiDAR modules 22 and/or processors in communication with the LiDAR modules 22. Although the depictions of the at least one point cloud 24 illustrated in FIGS. 2A and 2B may differ in appearance, it is contemplated that such difference may be a result of averaging depths of the points 36 of each point cloud 24 to render a surface (FIG. 2B) as opposed to individual dots (FIG. 2A). The underlying 3D data may be generated the same way in either case.

Still referring to FIGS. 2A and 2B, each point cloud 24 includes the three-dimensional data (e.g., a three-dimensional location relative to the LiDAR module 22) for the various features in the interior 18. For example, the at least one point cloud 24 may generate 3D mapping of the occupants 26 or cargo 37 in the interior 18. The three-dimensional data may include the rectilinear coordinates, with XYZ coordinates, of various points 36 on surfaces or other light-reflective features relative to the LiDAR module 22. It is contemplated that the coordinates of each point 36 may be virtually mapped to an origin point other than the LiDAR module 22, such as a center of mass of the vehicle, a center of volume of the compartment 28 being monitored, or any other feasible origin point. By obtaining the three-dimensional data of the various features in the interior 18 and, in some cases, the region exterior 20 to the vehicle 12, the present system 10 may provide for enhanced monitoring methods to be performed without complex imaging methods, such as those incorporating stereoscopic imagers or other three-dimensional monitoring devices that may require higher computational power or decreased efficiencies.

Figure 3:
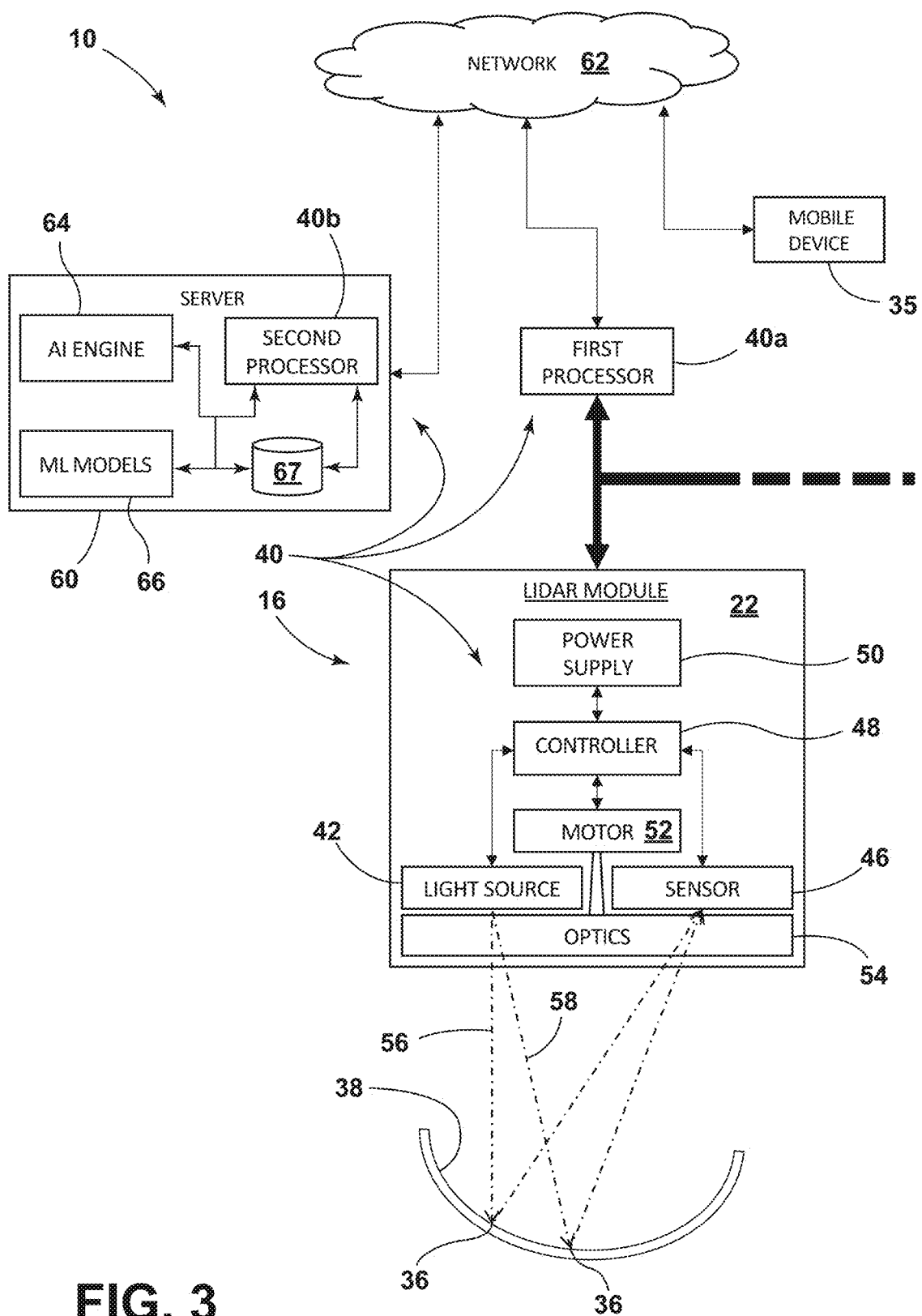
FIG. 3 is a block diagram of an exemplary detection system incorporating light detection and ranging.

Referring now to FIG. 3, at least a portion of the present detection system 10 is exemplarily applied to a target surface 38, such as to the cargo 37 or other surfaces in the environment 14 of the vehicle 12. The system 10 may include processing circuitry 40, which will be further discussed in relation to the proceeding figures, in communication with one or more of the time-of-flight sensors 16. In the present example, the time-of-flight sensors 16 include the LiDAR modules 22 each having a light source 42, or emitter, and a sensor 46 configured to detect reflection of the light emitted by the light source 42 off of the target surface 38. A controller 48 of the LiDAR module 22 is in communication with the light source 42 and the sensor 46 and is configured to monitor the time-of-flight of the light pulses emitted by the light source 42 and returned to the sensor 46. The controller 48 is also in communication with a power supply 50 configured to provide electrical power to the controller 48, the light source 42, the sensor 46, and a motor 52 that is controlled by the controller 48. In the present example, the LiDAR module 22 incorporates optics 54 that are mechanically linked to the motor 52 and are configured to guide the light pulses in a particular direction. For example, the optics 54 may include lenses or mirrors that are configured to change an angle of emission for the light pulses and/or return the light pulses to the sensor 46. For instance, the motor 52 may be configured to rotate a mirror to cause light emitted from the light source 42 to reflect off of the mirror at different angles depending on the rotational position of the motor 52.

In some examples, the optics 54 may include a first portion associated with the source 42 and a second portion associated with the sensor 46. For example, a first lens, which may move in response to the motor 52, may be configured to guide (e.g., collimate, focus) the light emitted by the source 42, and a second lens, which may be driven by a different motor or a different connection to the motor 52, may be configured to guide the light reflected off the target surface 38 and returned to the sensor 46. Accordingly, the general configuration of the LiDAR module 22 may incorporate a single housing having different sets of optics or a plurality of housings with different optics. For example, the source 42 may be located in a first housing of the LiDAR module 22, the sensor 46 may be located in a second housing separate from or spaced from the first housing. In this way, each of the LiDAR modules 22 may refer to any emitter/receiver combination system that emits LiDAR pulses and receives the LiDAR pulses either at a common location in the vehicle 12 or at different locations in the vehicle 12.

The light emitted and received by the present LiDAR modules 22 may have a wavelength in the range of between approximately 780 nanometers (nm) and 1700 nm. In some examples, the wavelength of the LiDAR is preferably in the range of between 900 nm and 1650 nm. In other examples, the wavelength of the LiDAR is preferably between 1500 nm and 1650 nm. In some examples, the wavelength of the LiDAR is preferably at least 1550 nm. It is contemplated that the particular wavelength/frequency employed by the LiDAR modules 22 may be based on an estimated distance range for capturing the depth information. For example, for shorter ranges (e.g., between 1 m and 5 m) the LiDAR may operate with a greater wavelength of light (e.g., greater than 1000 nm). The LiDAR modules 22 of the present disclosure may be configured to output light, in the form of a laser, at a wavelength of at least 1550 nm while the motor 52 rotates the optics 54 to allow mapping an area. In some examples, the LiDAR modules 22 of the present disclosure are configured to emit light having a wavelength of at least 1650 nm. Due to the relatively short distances scanned by the present LiDAR modules 22 (e.g., between one and five meters), such relatively low infrared (IR) or near-infrared (NIR) may be employed to achieve the three-dimensional spatial mapping via the at least one point cloud 24 with low power requirements. The present LiDAR modules 22 may be either single point-and-reflect modules or may operate in a rotational mode, as described above. In rotational mode, the LiDAR module 22 may measure up to 360 degrees based on the rate of rotation, which may be between 1 and 100 Hertz or may be at least 60 rotations per minute (RPM) in some examples.

In the example depicted in FIG. 3, the time-of-flight for a first pulse of light 56 emitted by the light source 42 and returned to the sensor 46 may be less than a second time-of-flight for a second light pulse emitted by the light source 42 returned to the sensor 46. For example, the first pulse of light 56 may travel a shorter distance than the second pulse of light 58 due to a difference in depth, height, or width of the corresponding reflection point 36 on the target surface 38. In this way, the LiDAR module 22 may generate the at least one point cloud 24 to be representative of the environment 14 (e.g., the target surface 38 in the present example) in three dimensions.

The processing circuitry 40 of the present disclosure may be provided to amalgamate the point cloud 24 from each of a plurality of the LiDAR modules 22 and process the coordinates of the features to determine an identity of the features, as well as to perform other processing techniques that will be further described herein. The processing circuitry 40 may include a first processor 40a local to the vehicle 12 and a second processor 40b remote from the vehicle 12. Further, the processing circuitry 40 may include the controller 48 of the LiDAR module 22. In some examples, the controller 48 may be configured to generate or determine the at least one point cloud 24 and/or point cloud data, and the first processor 40a may be configured to receive the at least one point cloud 24 from each LiDAR module 22 and compile each point cloud 24 of a common scene, such as the environment 14, to generate a more expansive or more accurate point cloud 24 of the environment 14.

The second processor 40b, which may be a part of a remote server 60 and in communication with the first processor 40a, via a network 62, may be configured to perform various modifications and/or mapping of the at least one point cloud 24 to target three-dimensional image data for the environment 14. For example, the server 60 may include an artificial intelligence (AI) engine 64 configured to train machine learning models 66 based on the point cloud data captured via the LiDAR modules 22 and/or historical data previously captured by the time-of-flight sensors 16. The second processor 40b may be in communication with the AI engine 64, as well as in communication with a database 67 configured to store the target point cloud data and/or three-dimensional image information. Accordingly, the server 60 may incorporate a memory storing instructions that, when executed by the processor, causes the processing circuitry 40 to compare the at least one point cloud 24 to point cloud data corresponding to target conditions of the interior 18 and/or the region exterior 20 to the vehicle 12. In this way, the detection system 10 may employ the processing circuitry 40 to perform advanced detection techniques and to communicate with subsystems of the vehicle 12, as will be described in the proceeding figures. In this way, the detection system 10 may be employed in tandem or in conjunction with other operational parameters for the vehicle 12. For example, the detection system 10 may be configured for communicating notifications to the occupants 26 of alert conditions, controlling the various operational parameters in response to actions detected in the interior 18, activating or deactivating various subsystems of the vehicle 12, or interacting with any vehicle systems to effectuate operational adjustments.

Figure 4:
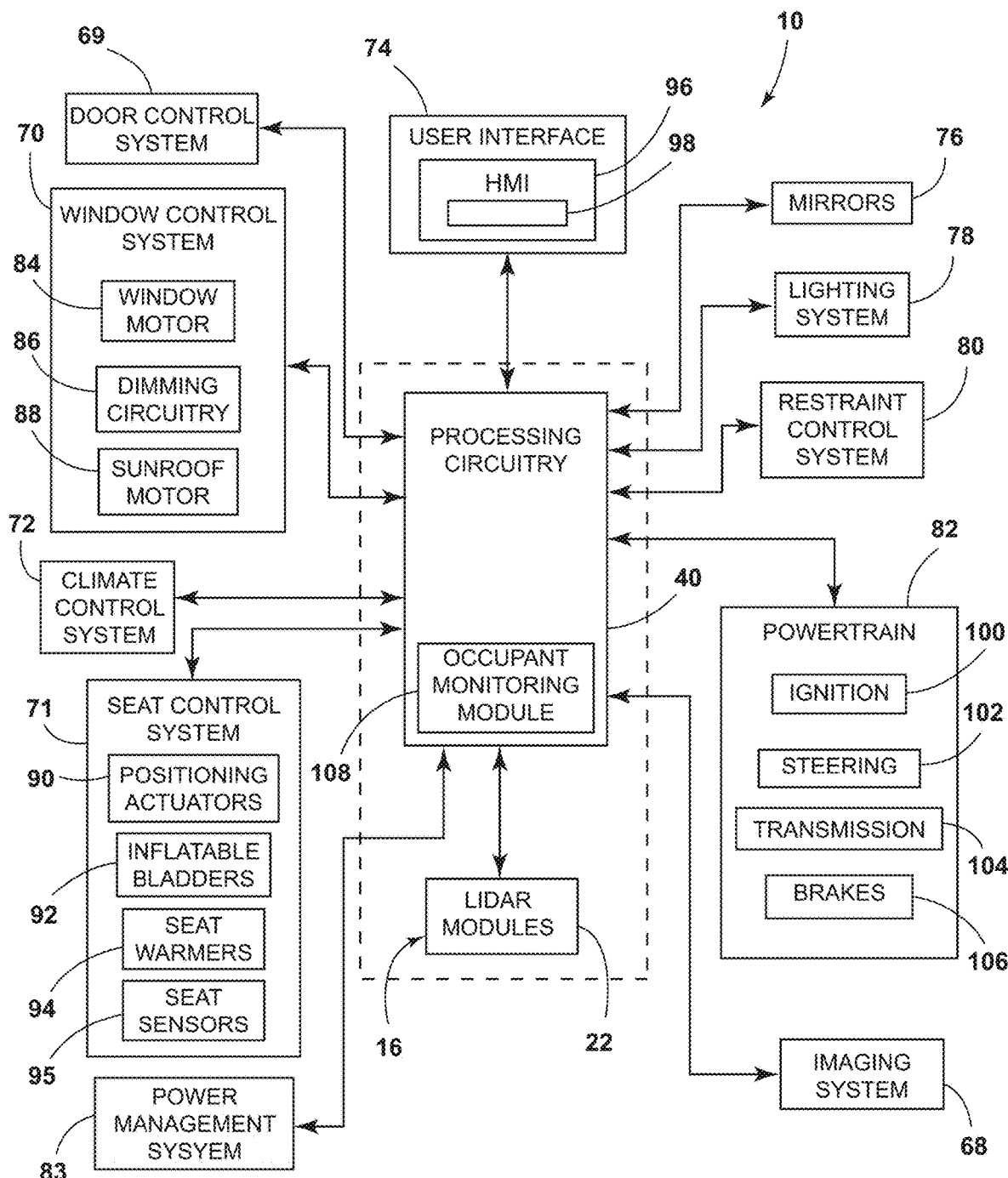
FIG. 4 is a block diagram of an exemplary detection system for a vehicle.

Referring now to FIG. 4, the detection system 10 may incorporate or be in communication with various systems of the vehicle 12 (e.g., vehicle systems). For example, the processing circuitry 40 may be configured to communicate with an imaging system 68 that includes imaging devices, such as cameras (e.g., red-, green-, and blue-pixel (RGB) or IR cameras). The processing circuitry 40 may further be in communication with other vehicle systems, such as a door control system 69, a window control system 70, a seat control system 71, a climate control system 72, a user interface 74, mirrors 76, a lighting system 78, a restraint control system 80, a powertrain 82, a power management system 83, or any other vehicle systems. Communication with the various vehicle systems may allow the processing circuitry 40 to transmit and receive signals or instructions to the various vehicle systems based on processing of the at least one point cloud 24 captured by the time-of-flight sensors 16. For example, when the processing circuitry 40 identifies a number of occupants 26 in the vehicle 12 based on the at least one point cloud 24, the processing circuitry 40 may communicate an instruction to adjust the seat control system 71 when the vehicle 12 is stationary and/or the climate control system 72. In another non-limiting example, the processing circuitry 40 may receive information or signals from the lighting system 78 and control operation of the time-of-flight sensors 16 based on the information from the lighting system 78. Accordingly, the processing circuitry 40 may control, or communicate instructions to control, the time-of-flight sensors 16 based on information from the vehicle systems and/or may communicate signals or instructions to the various vehicle systems based on information received from the time-of-flight sensors 16.

The window control system 70 may include a window motor 84 for controlling a position of a window of the vehicle 12. Further, the window control system 70 may include dimming circuitry 86 for controlling an opacity and/or level of light transmitted between the interior 18 of the vehicle 12 and the region exterior 20 to the vehicle 12. One or more sunroof motors 88 may be provided with the window control system 70 for controlling closing and opening of a sunroof panel. It is contemplated that other devices may be included in the window control system 70, such as window locks, window breakage detection sensors, and other features related to operation of the windows of the vehicle 12. By providing communication between the window control system 70 and processing circuitry 40 of the present disclosure, the window control system 70 may be configured to adjust one or more of its features based on conditions determined or detected by the processing circuitry 40 based on the at least one point cloud 24. Similarly, the window control system 70 may transmit one or more signals to the processing circuitry 40, and the processing circuitry 40 may control operation of the time-of-flight sensors 16 based on the signals from the window control system 70.

The climate control system 72 may include one or more heating and cooling devices, as well as vents configured to distribute heated or cooled air into the interior 18 of the vehicle 12. Although not specifically enumerated in FIG. 4, the climate control system 72 may be configured to actuate a vent to selectively limit and allow heated air or cooled air to circulate in the interior 18 of the vehicle 12. Further, the climate control system 72 may be configured to operate heating, ventilation, and air conditioning (HVAC) systems to recirculate air or to vent air to the region exterior 20 to the vehicle 12.

The seat control system 71 may include various positioning actuators 90, inflatable bladders 92, seat warmers 94, and/or other ergonomic and/or comfort features for seats 34 in the vehicle 12. For example, the seat control system 71 may include motors configured to actuate the seat 34 forward, backward, side to side, or rotationally when the vehicle 12 is stationary. Both a backrest of the seat 34 and a lower portion of the seat 34 may be configured to be adjusted by the positioning actuators 90 when the vehicle 12 is stationary. The inflatable bladders 92 may be provided within the seat 34 to adjust a firmness or softness of the seat 34 when the vehicle 12 is stationary, and seat warmers 94 may be provided for warming cushions in the seat 34 for comfort of the occupants 26. In one non-limiting example, the processing circuitry 40 may compare the position of the seats 34 based on seat sensors 95, such as position sensors, occupancy detection sensors, or other sensors configured to monitor the seats 34, to the point cloud data captured by the time-of-flight sensors 16 in order to verify or check an estimated seat position based on the point cloud data. In other examples, the processing circuitry 40 may communicate one or more signals to the seat control system 71 based on body pose data identified in the at least one point cloud 24 when the vehicle 12 is stationary. In yet further examples, the processing circuitry 40 may be configured to adjust an operational parameter of the time-of-flight sensors 16, such as a scanning direction, a frequency of the LiDAR module 22, or the like, based on the position of the seats 34 being monitored by the time-of-flight sensors 16.

The user interface 74 may include a human-machine interface (HMI) 96 and/or may include audio devices, such as microphones and/or speakers, mechanical actuators, such as knobs, buttons, switches, and/or a touchscreen 98 incorporated with the HMI 96. The human-machine interface 96 may be configured to present various digital objects representing buttons for selection by the user via, for example, the touchscreen 98. In general, the user interface 74 may communicate with the processing circuitry 40 to activate or deactivate the time-of-flight sensors 16, adjust operational parameters of the time-of-flight sensors 16, or control other aspects of the time-of-flight sensors 16. Similarly, the processing circuitry 40 may be configured to communicate instructions to the user interface 74 to present information and/or other data related to the detection and/or processing of the at least one point cloud 24 based on the time-of-flight sensors 16. It is further contemplated that the mobile device 35 may incorporate a user interface 74 to present similar options to the user at the mobile device 35.

Still referring to FIG. 4, other vehicle systems include the mirrors 76, the lighting system 78, and the restraint control system 80. These other vehicle systems may also be adjusted based on the at least one point cloud 24 generated by the time-of-flight sensors 16 and processed by the processing circuitry 40. Additionally, subcomponents of these systems (e.g., sensors, processors) may be configured to send instructions or data to the processing circuitry 40 to cause the processing circuitry 40 to operate the time-of-flight sensors 16 in an adjusted operation. For example, the processing circuitry 40 may be configured to deactivate the time-of-flight sensors 16 in response to the lighting system 78 detecting adequate lighting to allow for visible light and/or IR occupant monitoring. In some examples, the processing circuitry 40 may communicate an instruction to adjust a position of the mirrors 76 based on the at least one point cloud 24. For example, the at least one point cloud 24 may demonstrate an event, such as an orientation of a driver, a position of another vehicle in the region exterior 20 to the vehicle 12, or any other positional feature, and generate a signal to the mirrors 76 (or associated positioning members) to move the mirrors 76 to align a view with the event.

Referring again to FIG. 4, the vehicle 12 may include the powertrain 82 that incorporates an ignition system 100, a steering system 102, a transmission system 104, a brake system 106, and/or any other system configured to drive the motion of the vehicle 12. In some examples, the at least one point cloud 24 captured by the time-of-flight sensors 16 may be processed by the processing circuitry 40 to determine target steering angles, rates of motion or speed changes, or other vehicle operations for the powertrain 82, and communicate the target operations to the powertrain 82 to allow for at least partially autonomous control over the motion of the vehicle 12. Such at least partially autonomous control may include fully autonomous operation or semiautonomous operation of the vehicle 12. For example, the processing circuitry 40 may communicate signals to adjust the brake system 106, the ignition system 100, the transmission system 104, or another system of the powertrain 82 to stop the vehicle 12 or move the vehicle 12.

The processing circuitry 40 may further include an occupant monitoring module 108 that may communicate with any of the vehicle systems described above, as well as the time-of-flight sensors 16 of the present disclosure. The occupant monitoring module 108 may be configured to store various algorithms for detecting aspects related to the occupants 26. For example, the algorithms may be executed to monitor the interior 18 of the vehicle 12 to identify occupants 26 in the vehicle 12, a number of occupants 26, or other occupancy features of the interior 18 using the point cloud data and/or video or image data captured by the imaging system 68. Similarly, various seat sensors 95 of the seat control system 71, heating or cooling sensors that detect manual manipulation of the vents for heating or cooling control for the climate control system 72, inputs to the window control system 70, or any other sensor of the vehicle systems previously described may be processed in the occupant monitoring module 108 to detect positions of occupants 26 in the vehicle 12, conditions of occupants 26 in the vehicle 12, states of occupants 26 in the vehicle 12, or any other relevant occupancy features that will be described herein. The processing circuitry 40 may also include various classification algorithms for classifying objects detected in the interior 18, such as for the cargo 37, mobile devices 35, animals, and any other living or nonliving item in the interior 18. Accordingly, the processing circuitry 40 may be configured to identify an event in the interior 18 or predict an event based on monitoring of the interior 18 by utilizing information from the other vehicle systems.

In general, the detection system 10 may provide for spatial mapping of the environment 14 of the vehicle 12. For example, the LiDAR modules 22 may detect the position, in three-dimensional space, of objects, items, or other features in the interior 18 or the region exterior 20 to the vehicle 12. Such positions, therefore, include depth information of the scene captured by the LiDAR module 22. As compared to a two-dimensional image captured by a camera, the at least one point cloud 24 generated by the time-of-flight sensor 16 allows for more efficient determination of how far the features are from the LiDAR module 22 and from one another. Thus, complex image analysis techniques involving pixel analysis, comparisons of RGB values, or other techniques to estimate depth may be omitted due to utilization of the ToF sensors 16. Further, while multiple imaging devices from different angles of a common scene (e.g., a stereoscopic imager) may allow for more accurate estimation of depth information than those produced by a single camera, complex data processing techniques may be required for multiple cameras to be employed to gather the depth information. Further, such multi-camera systems may require additional weight, packaging volume, or other inefficiencies relative to the time-of-flight sensors 16 of the present disclosure.

Accordingly, the detection system 10 may be computationally-efficient and/or power-efficient relative to two-dimensional and three-dimensional cameras for determining positional information. Further, other time-of-flight sensing techniques, such as RADAR, while providing depth information, may present certification issues based on RF requirements and may be less accurate than the present LiDAR modules 22. Further, a number of cameras used for monitoring the environment 14 may be reduced, various presence detectors (vehicle seat sensors 95) may be omitted, and other sensors configured to determine positional information about the environment 14 may be omitted due to the precision of the LiDAR. Thus, a solution may be provided by the detection system 10 by reducing the number of sensors required to monitor various aspects of the environment 14.

Referring now to FIGS. 5-11, in one example, the system 10 is a detection system 10 for managing occupant interaction with components of the vehicle 12. The detection system 10 includes the time-of-flight sensor 16 configured to generate the at least one point cloud 24 representing the compartment 28 of the vehicle 12. The at least one point cloud 24 includes three-dimensional positional information about the compartment 28. The processing circuitry 40 is in communication with the time-of-flight sensor 16 and is configured to identify at least one body segment 120 of the user, or occupant 26, based on the at least one point cloud 24. The processing circuitry 40 is further configured to determine a position of at least one feature 122, 124 of the body segment 120. The processing circuitry 40 is further configured to calculate an orientation of the body segment 120 based on the at least one feature 122, 124. The processing circuitry 40 is further configured to estimate an intended task of the user based on the orientation of the body segment 120. The processing circuitry 40 is further configured to generate a response signal in response to estimation of the intended task. For example, the response signal may be a signal to one of the vehicle systems previously described to operate the particular vehicle system. The detection system 10 may employ the LiDAR modules 22 to track the location and/or orientation of various body segments 120 of the user in three-dimensional space for automated adjustments of visual systems and to provide enhanced gesture recognition and enhanced engagement with the HMI 96.

In some examples, the at least one body segment 120 includes a head 126 of the user. The at least one feature 122, 124 may be a facial feature 122 of the users head 126. For example, the at least one point cloud 24 may provide depth information to allow the processing circuitry 40 to determine positions of the face 122a, eyes 122b, nose 122c, ears 122d, mouth 122e, or any other feature detectable from the depth information. The orientation of the body segment 120 may refer to a tilt of the head 126. The intended task may be a gaze direction 130 of the user (e.g., a location the user is looking). In such examples, the processing circuitry 40 may be further configured to calculate the tilt of the head 126 based on the facial feature 122 and estimate the gaze direction 130 based on the tilt of the head 126. The processing circuitry 40 may further be configured to identify, based on the at least one point cloud 24, eyes 122b of the user. The processing circuitry 40 may further be configured to calculate a frontal plane 132 based on the eyes 122b of the user. For example, upon detection of the relative position of the eyes 122b of the user, the frontal plane 132 may be constructed corresponding to an outer surface of each eye 122b. The processing circuitry 40 may further be configured to determine a vector 134 normal to the frontal plane 132. The vector 134 may correspond to the estimation of the gaze direction 130. Accordingly, the estimation of the gaze direction 130 using the LiDAR modules 22 may be based on the head 126, or face 122a position following the determination of the facial features 122. Accordingly, due to limited identifying information being captured based on the at least one point cloud 24, but rather relying on geometries and proportions of three-dimensional shapes in the compartment 28, the gaze direction 130 may be estimated based on the tilt of the head 126 or the frontal plane 132 corresponding to the face 122a of the user.

In some examples, the processing circuitry 40 is further configured to communicate a signal to align an adjustable component 136 of the vehicle 12 based on estimation of the gaze direction 130. It is contemplated that the adjustable component 136 may refer to any adjustable component 136 of any of the previously described vehicle systems that are in communication with the processing circuitry 40. For example, the adjustable component 136 may be a motor, an actuator 90, or another electromechanical device configured to adjust the position of any of the previously described vehicle systems. In some examples, the adjustable component 136 is configured to adjust one or more of the mirrors 76, a component of the powertrain 82, the imaging system 68 (e.g., cameras), seats 34 when the vehicle 12 is stationary, positions of a steering wheel 170, pedals, or other vehicle controls, or any other component of the previously described vehicle systems.

In some examples, the adjustable component 136 is configured to adjust a visual feedback element 138. For example, the visual feedback element 138 may be a display. The adjustable component 136 may be configured to adjust a visual presentation of the display to align the display with the estimation of the gaze direction 130. For example, upon estimation of the gaze direction 130 toward the HMI 96, the user interface 74 may be configured to initiate a waking sequence or energize a backlight for the HMI 96 to enhance the visual presentation at the display and to align the display with the estimated gaze direction 130. In another example, a heads-up display (HUD) 140 may include a projection angle that may be adjusted based on the gaze direction 130. For example, the HUD 140 may be configured to project information corresponding to operation of the vehicle 12 in a vehicle-rearward direction, and, upon detection that the gaze direction 130 deviates from the vehicle-forward direction, the processing circuitry 40 may communicate instruction to the HUD 140 to adjust the projection angle to align with the gaze direction 130.

Figure 10:
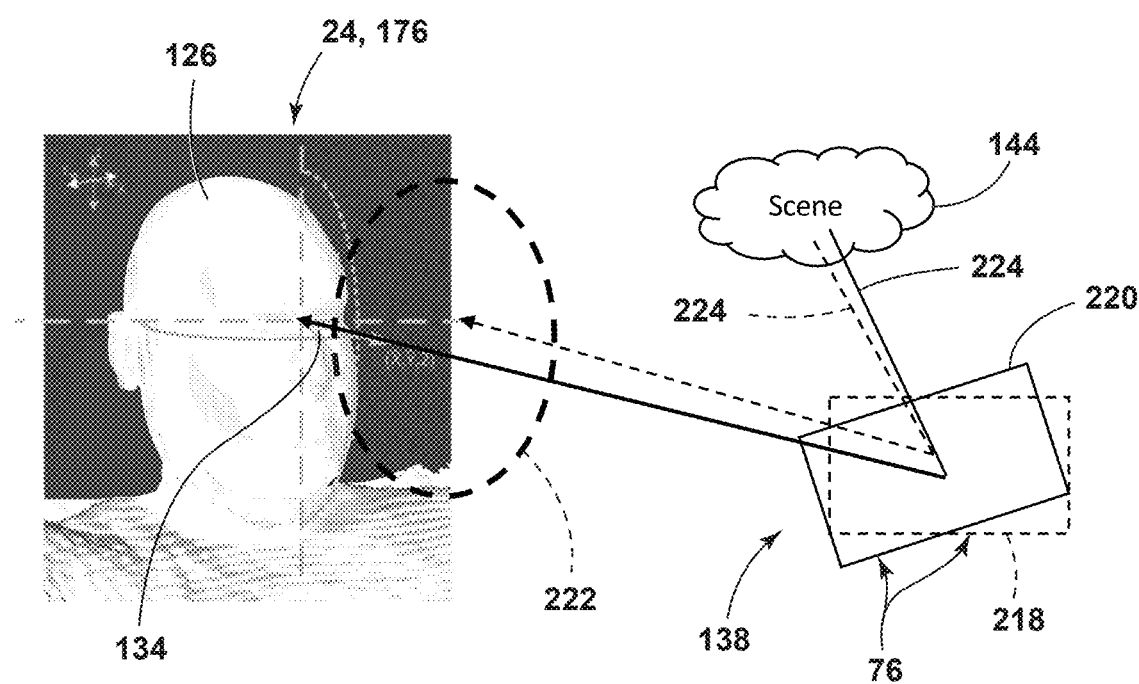
FIG. 10 is a perspective view of a point cloud of a user's hand demonstrating adjustment to a visual feedback element.

In some examples, the visual feedback element 138 is one of the mirrors 76. The adjustable component 136 may be configured to adjust an angle of the mirror 76 to align the mirror 76 with a target viewing angle. For example, based on a three dimensional position of the head 126 of the user in three-dimensional space, a scene 144 reflected from the mirrors 76 to the position of the head 126 may be sub-optimal (FIG. 10). For example, the scene 144 may be a rearview of the vehicle 12 in the target viewing angle, but such scene 144 may be viewable from a position other than the position of the head 126 of the user. For example, if the mirror 76 is aligned with a position of the head 126 of the user at a particular height H or lateral position, and the user is shorter than average, the mirror 76 may be adjusted by the adjustable component 136 to align the target viewing angle with the position of the head 126 of the user that is shorter than average. In some examples, the adjustable component 136 is configured to adjust a position of the user. For example, the positioning actuator 90 of the seat 34 may be energized or de-energized in order to move the user forward, backward, laterally, to a tilted position, or any other movement in order to align the head 126 of the user with the target viewing angle for the mirror when the vehicle 12 is stationary. The visual feedback element 138 may have a position determined by the processing circuitry 40 or stored in computer-aided design (CAD) data. For example, the processing circuitry 40 may process the at least one point cloud 24 to identify the various components of the vehicle 12. Based on the position of the components (e.g., the visual feedback element 138), the processing circuitry 40 may determine the target viewing angle for the user. Accordingly, based on the position of the occupant 26 relative to the components, the detection system 10 may determine the target viewing angle or the indication direction 158.

In addition or in an alternative, the at least one body segment 120 includes an appendage 146, such as a hand 148, a finger 150, an arm 152, or any other appendage. The at least one feature 122, 124 may be a longitudinal extension 124. For example, the longitudinal extension 124 may be a portion of the arm 152 or a portion of the finger 150. The orientation may be an indication direction 158. For example, the orientation of the body segment 120, such as the arm 152 and/or fingers 150, may refer to a direction pointed to by the user or an object pointed at by the user. The intended task may be an input selection of the user. The processing circuitry 40 may further be configured to calculate the indication direction 158 of the appendage 146 based on the longitudinal extension 124 and estimate the input selection based on the indication direction 158. For example, in response to a user pointing toward the HMI 96, the processing circuitry 40 may be configured to activate a backlight of the HMI 96, magnify a particular portion of the HMI 96 being pointed at, highlight or otherwise propose an option to be selected at the HMI 96 based on the indication direction 158, or the like.

In some examples, the processing circuitry 40 is configured to predict a system function of the vehicle 12 to be adjusted based on estimation of the input selection and present an option to activate the system function. For example, the processing circuitry 40 may determine that the user is pointing toward a volume control knob 160 and consequently pointing downward to indicate that the user desires the volume to be turned down in the vehicle 12. Based on the indication direction 158 (e.g., two indication directions), the processing circuitry 40 may predict that the user would like to turn the volume down and, in response, propose an option to turn down the volume at the user interface 74. Accordingly, the processing circuitry 40 may be configured to identify, based on the at least one point cloud 24, a gesture 162 by the user. The processing circuitry 40 may further be configured to select, via the processing circuitry 40 the option based on the gesture 162. Accordingly, in addition to causing the option to be presented to confirm the desired adjustment to a parameter of the system function, the present detection system 10 may be configured to perform the adjustment without verification. Accordingly, the system may operate in a first operational mode in which the verification to adjust the system function is presented and a second operational mode in which the system function is adjusted automatically.

In some examples, the input selection is manipulation of a mechanical switch 164. For example, the volume control knob 160 may be a mechanical switch 164. In some examples, the input selection is a digital indicator 166 presented at the user interface 74 of the vehicle 12. In some examples, the processing circuitry 40 is further configured to communicate a signal to adjust the size of the digital indicator 166 at the user interface 74 based on the identification of the gesture 162. For example, as previously described, a portion of the display at the user interface 74 may be magnified in response to the processing circuitry 40 determining the indication direction 158 being pointed toward a particular portion of the user interface 74.

Figure 5:
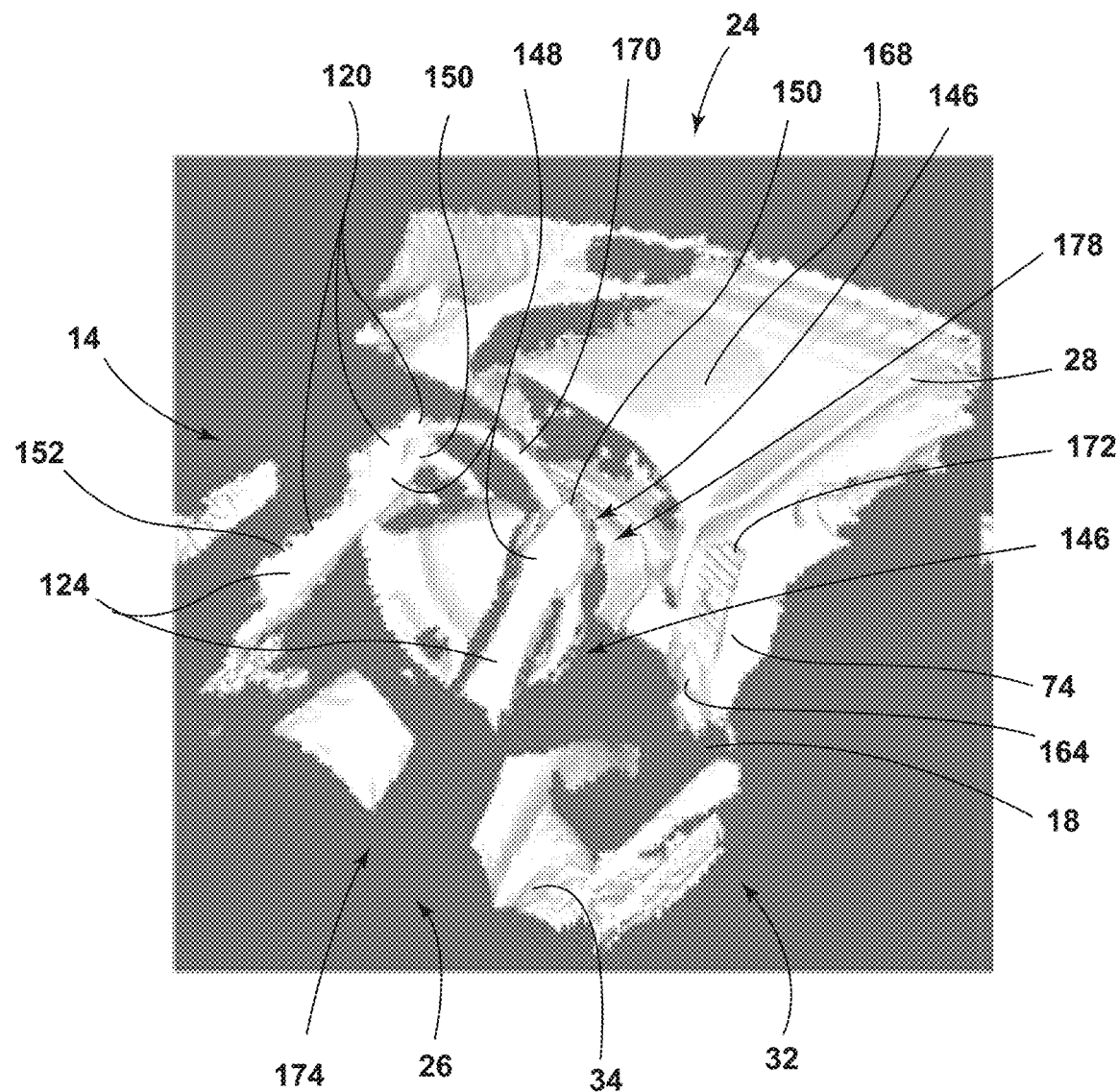
FIG. 5 is a representation of a point cloud generated by a time-of-flight sensor configured to monitor a passenger compartment of a vehicle of the present disclosure.
Figure 6:
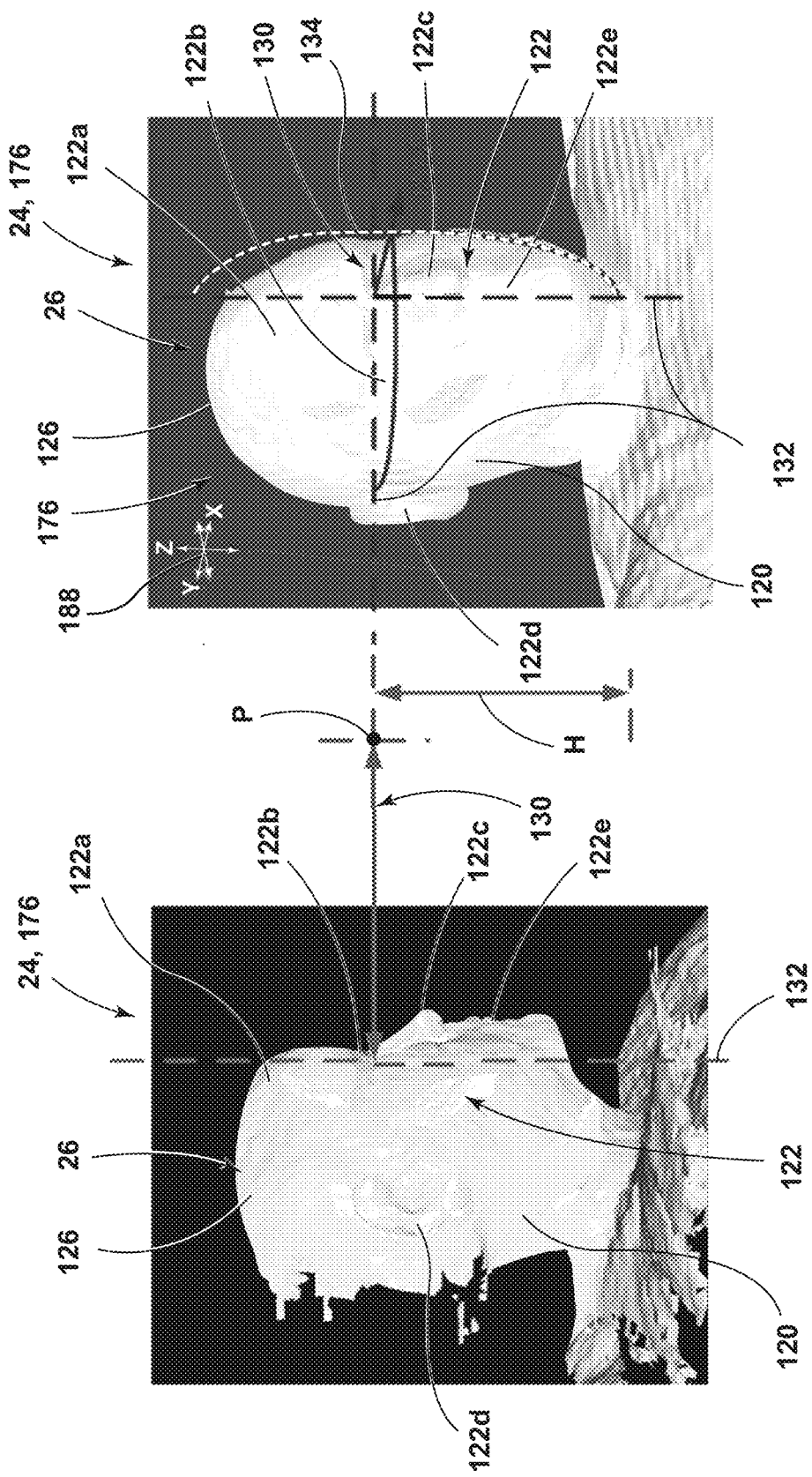
FIG. 6 illustrates a point cloud of a user's head from a side perspective view and an angled perspective view indicating a gaze direction.

Referring now more particularly to FIGS. 5 and 6, the at least one point cloud 24 generated by the LiDAR modules 22 may include three-dimensional spatial information about a dashboard 168 of the vehicle 12, the steering wheel 170 of the vehicle 12, the at least one body segment 120 of the user, a vent 172 in the compartment 28, or any other details within the range of the LiDAR module 22 that may be scanned. It is contemplated that, while the view illustrated in FIG. 5 is a top-down view directed toward a driver side 174 of the vehicle 12, a plurality of the LiDAR modules 22 may be provided in the compartment 28 as previously described for generating a three-dimensional map of a greater portion of the compartment 28 and/or with greater precision than with use of a single LiDAR module 22. For example, with respect to FIG. 6, a LiDAR module 22 may be directed toward the user and be configured to capture a first portion 176 of the at least one point cloud 24 corresponding to the head 126 of the user. A second portion 178 of the at least one point cloud 24 may be directed toward or include the positional information related to the appendage 146 of the user (FIG. 5).

In general, the present detection system 10 may scan and track the shape of the driver's 26 body and limbs and, with appropriate algorithms, calculate with high precision where the head 126 and/or hands 148 of the driver 26 are located, as well as how the head 126 and/or hands 148 are oriented and moving. Utilizing the ability to track the physical dimensions of the user, the detection system 10 may determine a three-dimensional vector 134 representing where the head 126 is looking (e.g., the gaze direction 130), where the hands 148 are pointing (e.g., the indication direction 158), or where the head 126 and/or hands 148 are moving. By providing a three-dimensional model of the hands 148 of the user, more accurate gesture tracking may be provided as compared to utilizing a two-dimensional sensor and applying edge detection, such as what may be provided by the imaging system 68. In the present detection system 10, a three-dimensional model of the hand 148 can be generated and the shape of the hand 148 may be analyzed for more nuanced gesture detection. For example, not only may the detection system 10 provide for the shape of the hand 148, but may also provide for the location, in three-dimensional space, of the hand 148. Accordingly, a gesture 162 by the head 126 or the hands 148 of the user performed in one region of the vehicle 12 may be differentiated from the same gesture 162 being performed in another region of the vehicle 12.

Referring now more particularly to FIG. 5, the appendage 146 may be the arm 152 of the occupant 26, and the at least one feature 122, 124 of the body segment 120 may be the longitudinal extension 124 of the arm 152 toward the steering wheel 170. For example, as will further be described with respect to FIG. 8, skeleton models 182 may be applied to the at least one point cloud 24 generated by the LiDAR modules 22 in order to estimate keypoints 184 of the user based on the positions of the body segments 120 of the user relative to one another. The orientation of the body segment 120, which, in this case, maybe a forward extension of forearms 186 of the user to grip the steering wheel 170 may allow the processing circuitry 40 to estimate the intended task of steering the vehicle 12. As will be described further herein, other intended tasks having less direct physical contact with components of the vehicle 12 may be estimated, such as using gestures 162 without physical contact or with limited physical contact with the vehicle 12 to communicate with the detection system 10 to adjust various system functions as previously described.

With particular reference to FIG. 6, the at least one point cloud 24 generated by the LiDAR module 22 may allow for tracking of the head 126 of the user in order to automatically measure the location and orientation of the head 126, the face 122a, the eyes 122b, the nose 122c, ears 122d, mouth 122e, or other various facial features 122 of the driver 26, and calculate settings to align the adjustable components 136 to optimize visual performance and effect adjustment of the adjustable components 136 based on the calculation. For example, the at least one point cloud 24 may include three-dimensional positional information of the mirrors 76, the steering wheel 170, the brake pedals, or any other components, or such positions may be known based on preconfigured vehicle settings. Such vehicle settings may be accessible by the processing circuitry 40 via communication with the various vehicle systems previously described. Accordingly, the at least one point cloud 24 may be compared to information collected by the other vehicle systems based on proximity sensors, capacitive sensors, inductive sensors, encoder information for motors that control the position of the various adjustable components, etc.

Still referring to FIG. 6, using the facial features 122 and reference measurement of height H and a distance of the eyes 122b to known surfaces, such as the dashboard 168, steering wheel 170, mirrors 76, seating, or any other object in the compartment 28, the detection system 10 may generate the vector 134 indicative of the direction pointed by the head 126 of the driver 26. Thus, by associating the direction of the head 126 with a gaze direction 130, six degrees of freedom 188 of the gaze direction 130 may be estimated by the processing circuitry 40 for the vector 134. As previously described, the vector 134 may be generated based on determination of the frontal plane 132 corresponding to a plane intersecting the eyes 122b of the user. Other facial features 122 may be employed to more precisely define the frontal plane 132, such as the nose 122c, the mouth 122e, or the other facial features 122. In general, the first portion 176 of the at least one point cloud 24 (e.g., the portion corresponding to the head 126 of the user) may provide the depth information necessary to generate the frontal plane 132.

Still referring to FIG. 6, it is contemplated that reference measurement to a fixed point P forward of the face 122a of the user may indicate to the processing circuitry 40 how far the eyes 122b are from any interior object or surface. Further, the reference measurement from the height H of the eyes 122b to a reference point below or above, the user may indicate the height H of the eyes 122b of the user from a floor of the vehicle 12 and/or a headliner of the vehicle 12. Accordingly, the gaze direction 130 of the user may be estimated by the processing circuitry 40. As will be further described herein, the skeleton model 182 may also be applied to the first portion 176 of the at least one point cloud 24 in order to more precisely define the keypoints 184 of the head 126, such as the center of the head 126, the location of the ears 122*d*, eyes 122*b*, and nose 122*c* of the face 122*a*, and the like. The skeleton model 182 may be described further in relation to the proceeding figures.

Figure 7A:
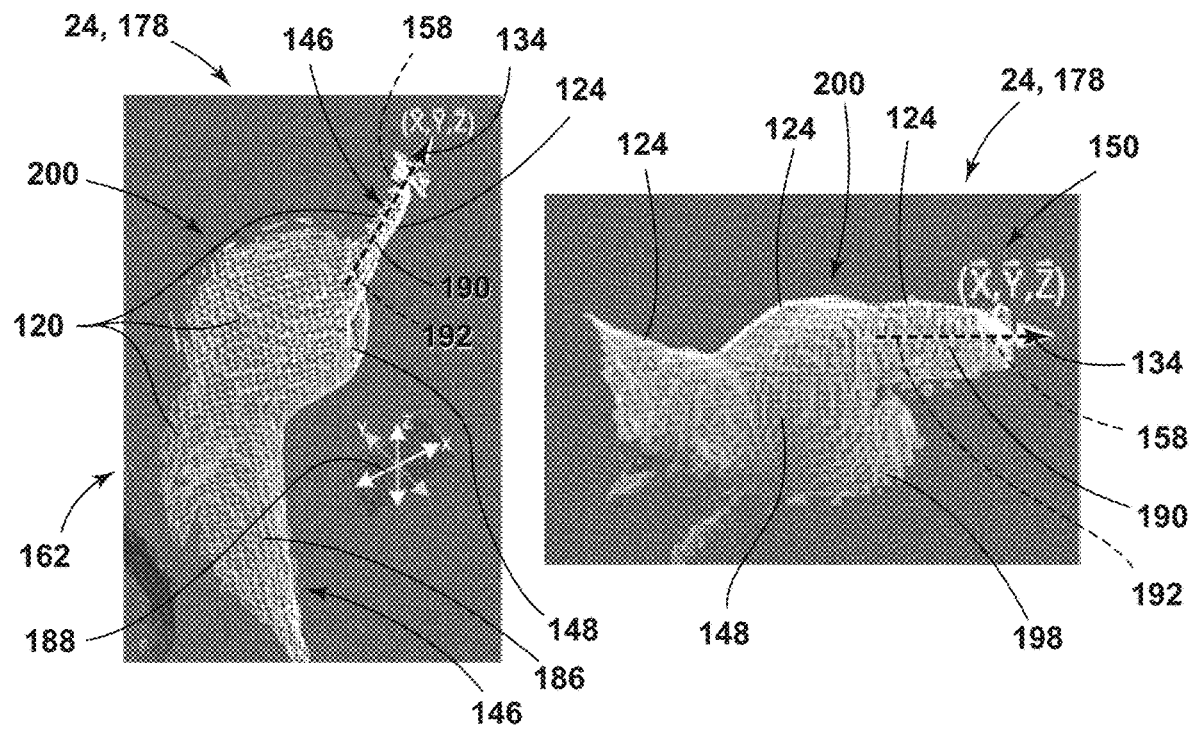
FIG. 7A is a representation of a point cloud of an arm and hand of a user indicating an indication direction.
Figure 7B:
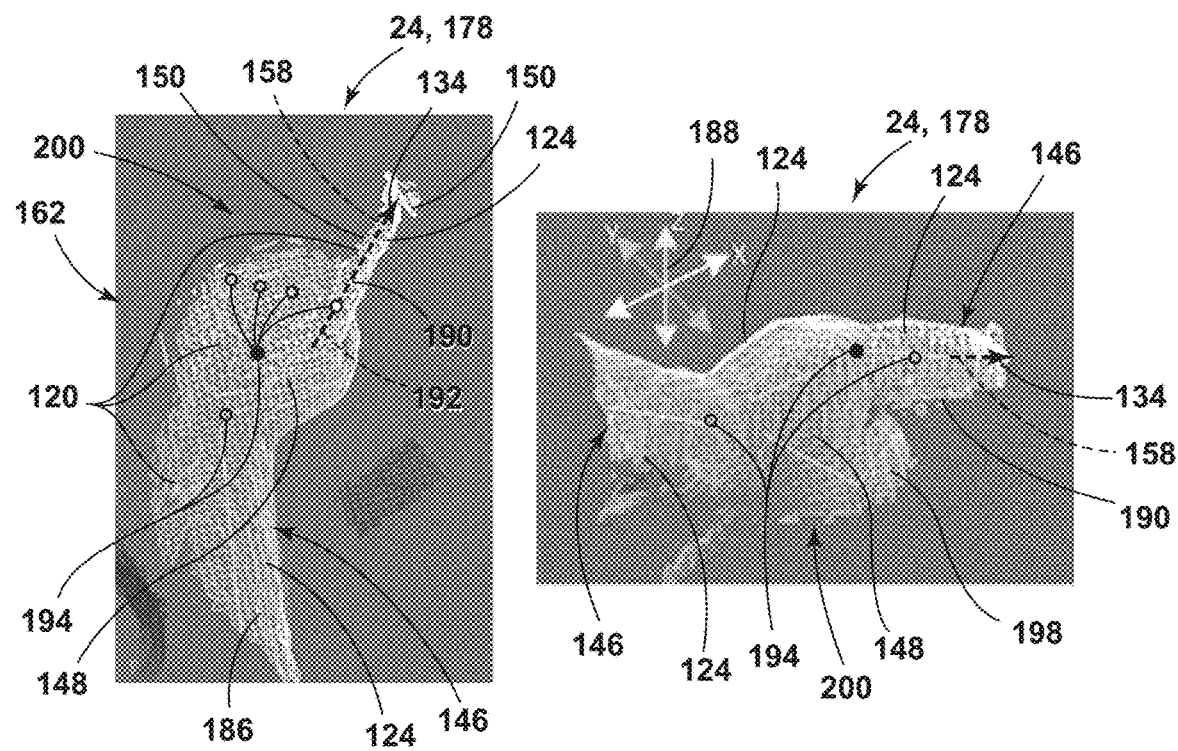
FIG. 7B is a representation of a point cloud of an arm and hand of a user indicating an indication direction with a skeleton model overlaying the point cloud.

Referring now to FIGS. 7A and 7B, the second portion 178 of the at least one point cloud 24 corresponding to the appendage 146 of the user is illustrated in an example in which the hands 148 and arm 152 of the user indicate the indication direction 158. For example, with respect to FIG. 7A, the index finger 190 of the user may be identified by the processing circuitry 40 based on the shape (e.g., the elongated shape) relative to other shapes identified in the at least one point cloud 24 corresponding to the hand 148 and arms 152 of the user. In the present example, the body segment 120 indicating the indication direction 158 may be the index finger 190, though the orientation of the hand 148 relative to the arm 152 of the user may indicate the indication direction 158 in at least one alternative. As demonstrated, the vector 134 indicating the indication direction 158 overlays the index finger 190 and corresponds to a central axis 192 of the longitudinal extension 124 of the index finger 190. Accordingly, based on the at least one point cloud 24, the processing circuitry 40 may be configured to determine the indication direction 158.

With particular reference to FIG. 7B, the processing circuitry 40 may also be configured to correlate the at least one point cloud 24 with the skeleton model 182 for the user as indicated by the sections overlaying the at least one point cloud 24 in the representations of FIG. 7B. For example, the various keypoints 184 of the skeleton model 182 corresponding to joints 194 and/or angles in the shape of the at least one point cloud 24 may be determined by the processing circuitry 40, and orientations of each section may correlate with relative positions of the body segments 120. Accordingly, the precision in the estimation of the indication direction 158 may be enhanced by the incorporation of the skeleton model 182. By incorporating the skeleton model 182, the shape, as well as known orientations of the index finger 190 relative to the hand 148 or the remainder of the fingers 150 of the hand 148 may be used to refine the estimation of the indication direction 158. For example, the skeleton model database 208 and/or body pose database 206 that is provided with the processing circuitry 40, or in communication with the processing circuitry 40, may store pose information related to tucking of the thumb 198 of the user underneath the index finger 190 to indicate a pointing gesture 200. Accordingly, the gestures 162 of the user may be detected to indicate different functions.

For example, while the gesture 162 of FIGS. 7A and 7B may be the pointing gesture 200 having the indication direction 158, other gestures 162 may be detected by the present detection system 10 and correlate such gestures 162 to modification of the vehicle system functions as previously described. For example, waving of the hand 148, tilting of the head 126 of the user, or any other movement of the head 126 or hands 148 may be detected by the detection system 10 to control the various system functions.

Figure 8:
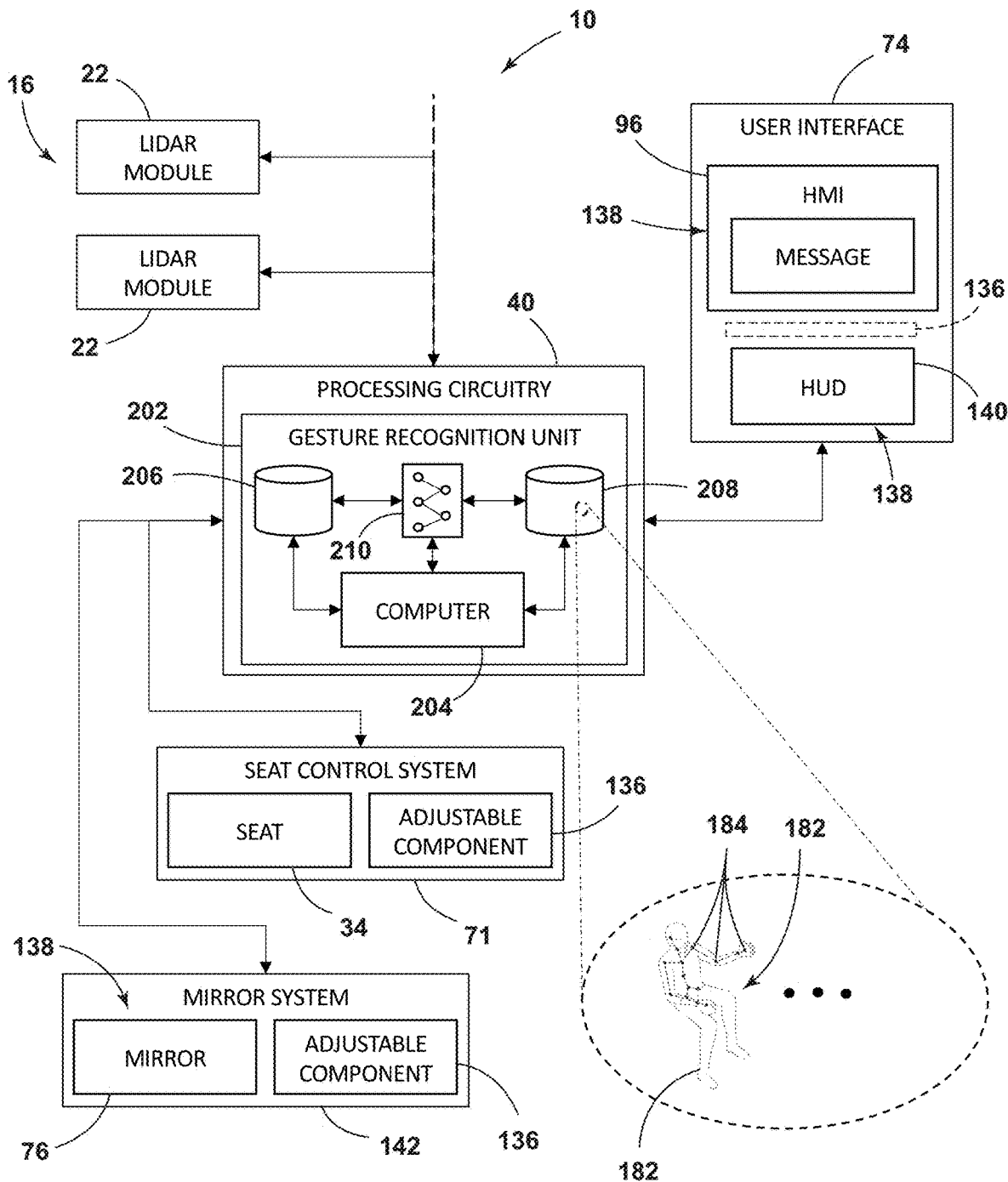
FIG. 8 is a block diagram of an exemplary detection system for a vehicle.

Referring now to FIG. 8, the processing circuitry 40 may include a gesture recognition unit 202 that is configured to process the at least one point cloud 24 captured by the LiDAR module 22 and output one or both of the indication direction 158 and the gaze direction 130. More generally, the gesture recognition unit 202 may be configured to output the intended task. For example, the vector 134 indicating the indication direction 158 and/or the gaze direction 130 may be determined by a computer 204 in communication with the body pose database 206 and the skeleton model database 208 that are each trained with one or more neural networks 210 to determine the intended task. As previously described, the skeleton model database 208 may include the skeleton models 182 that may include various keypoints 184 corresponding to points of interest for the occupant 26. For example, various body segments 120, such as the arms 152, hands 148, head 126, or any other body segment 120 of the occupant 26 may be mapped to the various keypoints 184 and sections interposing the keypoints 184 to accurately determine the intended gaze direction 130 and/or the indication direction 158. The body pose database 206 may include body pose data related to the various gestures 162 that may be detected by the gesture recognition unit 202. For example, the body pose data may include various hand 148 signals, head 126 signals, such as tilting of the head 126, nodding, shaking of the head 126, back-and-forth movements, hand positions, hand configurations, signs, pointing motions, or any other gesture 162 that may be mapped to or correlated with the at least one point cloud 24 captured by the LiDAR module 22. In operation, the computer 204 may determine various proportions and/or geometries of the occupant 26 and/or other objects in the compartment 28 based on the at least one point cloud 24 and correlate or compare such shapes to known skeleton model 182 positions and/or body pose data.

Still referring to FIG. 8, the user interface 74 may further include the HUD 140 in addition to the HMI 96 previously described. The HUD 140 may be a projected image having a projection angle that may be adjusted in response to signals from the processing circuitry 40. The signals from the processing circuitry 40 may be generated based on the target viewing angle previously described and/or the gaze direction 130 of the user. Similarly, and as previously described, the HMI 96 may adjust the display of various digital objects on the HMI 96 in response to determination of the indication direction 158 and/or the gaze direction 130. The one or more mirrors 76 of the mirror system 142 may further be adjusted based on signals from the processing circuitry 40 in response to detection of the gaze direction 130 and/or the head 126 position or indication directions 158. Such adjustment by the adjustable component 136 of the mirrors 76 may result in the target viewing angle being achieved for the position of the user's head 126. Accordingly, the various visual components, such as the HMI 96, the HUD 140, and the mirror system 142 may be adjusted in response to the gaze direction 130 and/or the indication direction 158.

Still referring to FIG. 6, in some examples, the processing circuitry 40 is configured to communicate signals to the seat control system 71 to adjust the position of the seat 34 that the user is in or in another seat based on the gaze direction 130, the indication direction 158, or the target viewing angle when the vehicle 12 is stationary. Such adjustments may also be made in combination with an adjustment to the mirror system 142 and the seat control system 71 when the vehicle 12 is stationary. For example, the adjustable component 136 may be the positioning actuator 90 previously described, such as a motor or other electromechanical device that causes the seat 34 to move when the vehicle 12 is stationary. Accordingly, the seat 34 may move the user, and more particularly, the head 126 of the user, to a target position 220 that may be aligned with the target viewing angle according to light reflected off of the mirrors 76 of the mirror system 142 when the vehicle 12 is stationary.

Figure 9:
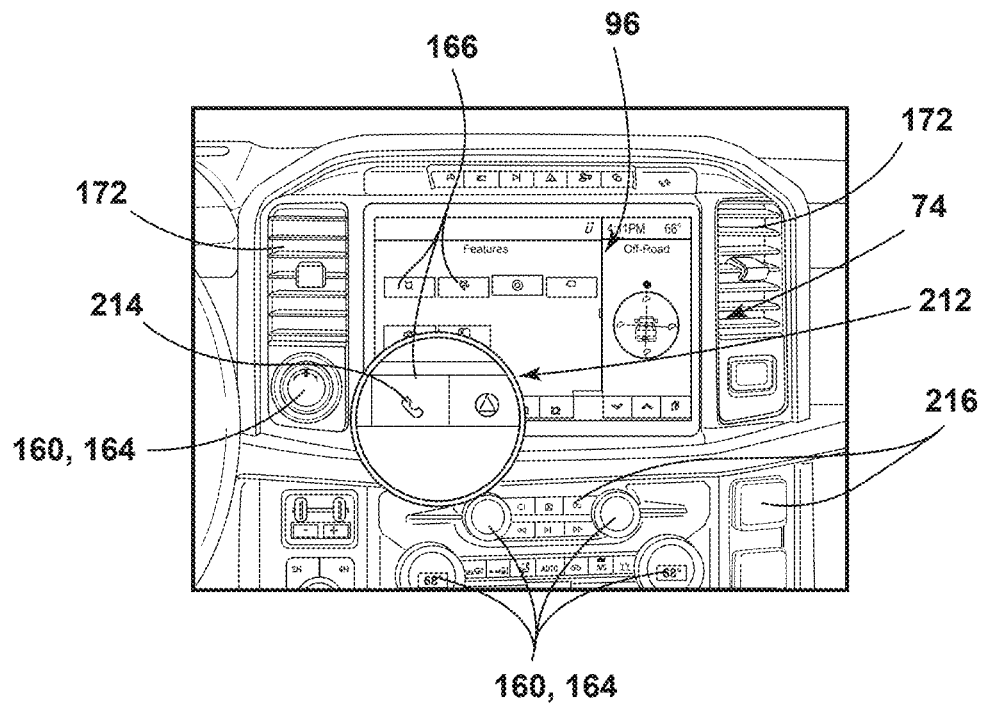
FIG. 9 is a front view of an HMI of a vehicle with a digital object on the HMI magnified in response to detection of an indication direction.

Referring now more particularly to FIGS. 9 and 10, exemplary adjustments to the visual feedback elements 138 are demonstrated with respect to the HMI 96 (FIG. 9) and a side view mirror 76 (FIG. 10). In the example illustrated in FIG. 9, the processing circuitry 40 may detect the user pointing toward the HMI 96 and, more particularly, a lower left quadrant 212 of the HMI 96. In response, the processing circuitry 40 may communicate an instruction to the user interface 74 to adjust the digital object (e.g., a phone icon 214) to be magnified to allow the user to more easily select the digital object. It is contemplated that the response based on the signals from the processing circuitry 40 may be to otherwise highlight or indicate to the user that a particular digital object has been selected for increased focus or resolution. For example, a section of the screen may be highlighted corresponding to where the user is pointing (e.g., the indication direction 158) or looking (e.g., the gaze direction 130). Accordingly, by implementing the present LiDAR modules 22 of the detection system 10 of the present disclosure, user engagement and quick responsiveness may be provided for adjustment to various system functions.

With continued reference to FIG. 9, various mechanical switches 164, such as the control knobs 160 for the volume, climate control settings, or the like may also be electronically adjusted without causing physical actuation of the mechanical switches 164. For example, if the at least one point cloud 24 demonstrates that the user is pointing toward the heat control buttons 216 and/or audio system functions, the processing circuitry 40 may communicate an instruction to adjust the climate control system 72 and/or audio for the vehicle 12, respectively. In another example, upon detection of the indication direction 158 toward the mechanical switch 164, the processing circuitry 40 may commute a signal to the user interface 74 to present the option to increase the volume, to adjust the audio settings and/or the climate control settings. For example, the HMI 96 may be more accessible from a position of the user in the vehicle 12 than the mechanical switches 164 (e.g., the control knobs 160 and/or buttons) are. In this way, the detection system 10 may further enhance accessibility to adjustment to the various system functions.

Referring particularly to FIG. 10, the visual feedback element 138 in the form of the mirror 76 may be adjusted from an initial position 218 to the target position 220 in response to a position and/or orientation of the head 126 of the user in the vehicle 12. For example, an average or normalized position 222 of the head 126 of an average user may correspond to the initial position 218 of the mirror demonstrated in FIG. 10. In response to the detection of the occupant's 26 head 126 being offset slightly to the side with a slightly different viewing angle, the processing circuitry 40 may communicate instruction to the adjustable component 136 of the mirror system 142 to adjust the position of the mirror to align the target scene 144 with the eyes 122b of the user. For example, as illustrated, light 224 reflected from the scene 144 off of the mirror in the initial position 218 may result in this scene 144 being viewable by the occupant 26 in the normalized position 222. However, once adjusted, the mirror may align the light 224 from the scene 144 with the actual position of the user's head 126. It is contemplated that this adjustment may be used in combination or alone with adjustment to the position of the seat 34 when the vehicle 12 is stationary. In this way, the LiDAR modules 22 may be employed by the detection system 10 to more accurately align the visual feedback element 138 for the target viewing angle.

As previously described with respect to FIG. 8, the at least one point cloud 24 may be combined with the skeleton model 182 algorithm to track articulating joints 194 of the driver 26, such as the head 126, arms 152, hands 148, fingers 150, or any other body part relating to the torso, create the 3D skeleton model 182, and predict the indication direction 158 or the gaze direction 130. Further, gestures 162 performed by the occupant 26 may be more accurately detected and classified using the depth information in the at least one point cloud 24. It is contemplated that, in the illustrated examples, midway points between the eyes 122b of the occupant 26 may be determined by the processing circuitry 40 and the gaze direction 130 may be based off of the midpoint between the eyes 122b. In other examples, the nose 122c of the occupant 26 may be employed to generate a more centrally located direction of the head 126 or orientation of the head 126. It is further contemplated that, by calculating the frontal plane 132, tilts of the head 126 in six degrees of freedom 188 (e.g., forward and backward, side to side, and face rotation) may be determined to define the range of the gaze direction 130 and physical limitations on the body of the occupant 26.

Figure 11:
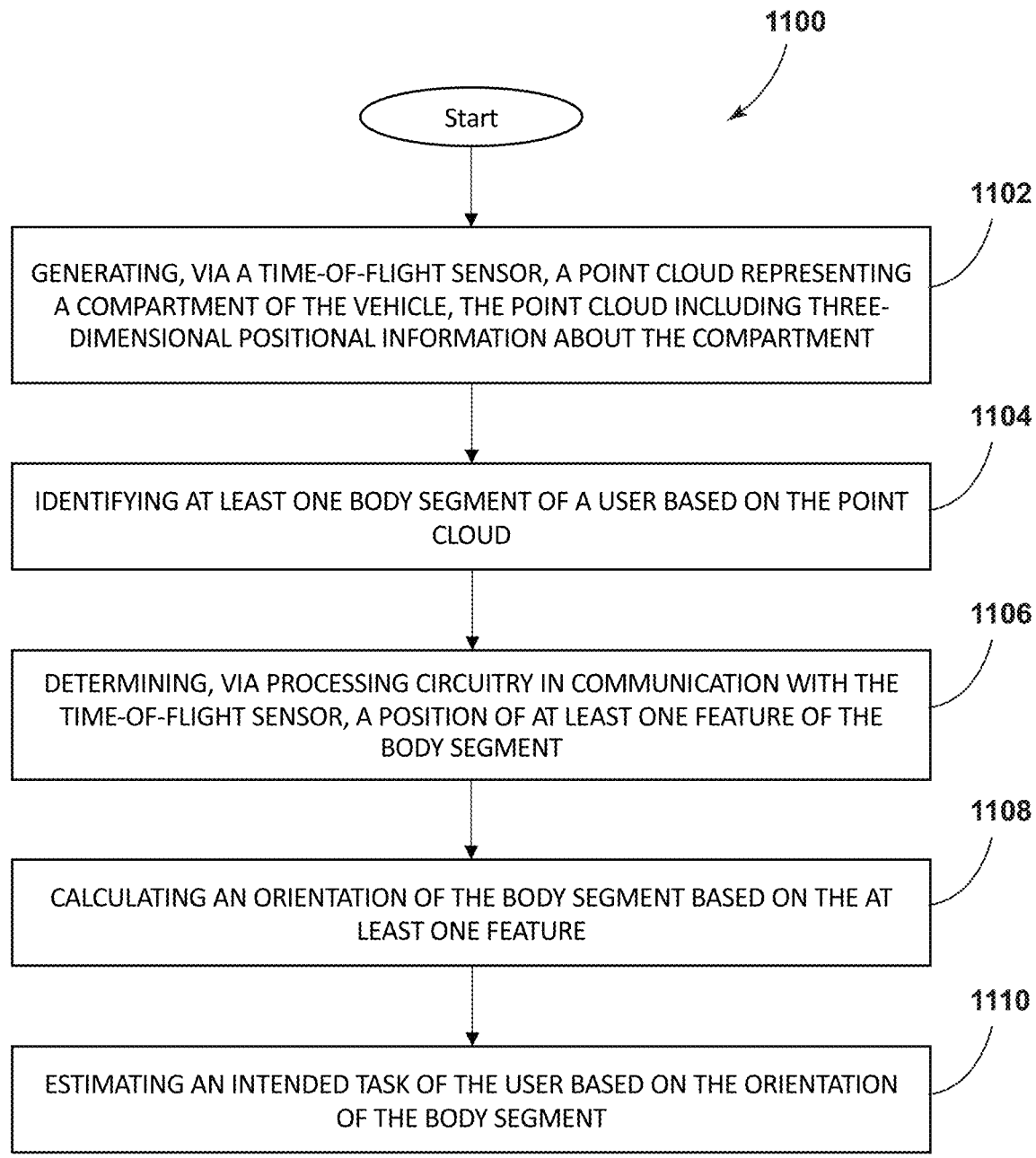
FIG. 11 is a flow diagram of a method for managing interaction with components of a vehicle.

Referring now to FIG. 11, a method 1100 for managing occupant interaction with the components of the vehicle 12 may include generating, via the time-of-flight sensor 16, the at least one point cloud 24 representing the compartment 28 of the vehicle 12 at step 1102. The at least one point cloud 24 may include three-dimensional positional information about the compartment 28. At step 1104, the method 1100 includes identifying at least one of the body segment 120 of the user based on the at least one point cloud 24. The method 1100 further includes determining, via the processing circuitry 40 in communication with the time-of-flight sensor 16, the position of the at least one feature 122, 124 of the body segment 120 at step 1106. The method 1100 further includes calculating the orientation of the body segment 120 based on the at least one feature 122, 124 at step 1108. The method 1100 further includes estimating the intended task for the user based on the orientation of the body segment 120 at step 1110. As previously described, the at least one feature 122, 124 may include facial features 122 and/or shapes of the head 126 or the appendage 146, respectively, and the orientation may refer to an extension or vector 134 relative to the frontal plane 132 for the head 126 of the user. Accordingly, the tilt of the head 126 may be calculated by the processing circuitry 40 based on the facial feature 122 (e.g., the eyes 122b) and the gaze direction 130 of the head 126 may be determined based on the tilt of the head 126.

In some examples, the detection system 10 employs a three-dimensional coordinate calculus and trigonometric algorithms to determine an optimal orientation for the adjustable systems (e.g., the visual feedback elements 138) to present relevant information to the user from any viewing angle by the user. Further, in some examples, simple gesture recognition may be performed by the detection system 10, including predefined gestures 162 or trained gesture recognition, as well as custom user-recorded gestures 162 that may be programmed to the detection system 10 functions. For example, turning the volume up, down, or muting, changing the radio or satellite station, navigating on-screen menus, or the like may be preprogrammed gestures 162 or may be user-recorded gestures 162. Further, highlighting or magnifying the digital objects on the HMI 96 corresponding to where the user is pointing may be presented. It is contemplated that, as the position of the user's arm 152 or hand 148 approaches the HMI 96, the processing circuitry 40 may adjust the magnification level and/or modify the visual object magnified as the intended button to be selected by the user is determined. Accordingly, the particular digital object may be highlighted or become more focused to reduce the amount of time the user's gaze direction 130 is adjusted for adjusting system functions. Accordingly, the visual feedback may be provided to the user to guide and enhance proper vehicle function adjustment.

The detection system 10 may further provide for greater accessibility to users having a handicap, such as muteness, to allow sign language to be used to control the various system functions without warranting audio feedback or voice instruction to make such adjustments. As the vector 134 estimated by processing circuitry 40 has increased accuracy due to updating of the machine learning models 66 based on new data, the indication direction 158 may cause a cursor on the HMI 96 to adjust based on the direction. Thus, various techniques for aiding user interaction and adjustment to vehicle functions may be provided by the present detection system 10.

In one example, the processing circuitry 40 may be equipped with a programming mode for programming user-defined gestures 162. In such a mode, the HMI 96 or another user interface may present a view of the driver area, and the user may program soft buttons based on tapping or engaging with various surfaces in the driver area. For example, tapping or touching a surface or other location in the driver area a specific number of times or with a specific gesture (e.g., three fingers, two fingers, a fist) may result in specifically programmed adjustments to the vehicle functions. In this way, engaging with various surfaces that are not typically associated with digital feedback (e.g., a dashboard, center console, etc.) and/or surfaces lacking a touchscreen or overlaying a defective touch panel may be employed for acting as a "soft button" or "soft switch." For example, while a physical switch or button may be absent from a surface, a pattern or gesture having interaction with the surface may result in one or more digital operations for the vehicle 12 being performed based on the pattern. It is further contemplated that various gestures, such as user-defined gestures, that cause particular operations of the vehicle 12 may be demonstrated or presented on the interface 74 to guide the user to activate the particular operation.

In general, the detection system 10 may allow for easier access of a plurality of drivers that may be interchanged in the vehicle 12 to have customized component adjustments, via the adjustable component 136 due to the precision of the depth mapping of the LiDAR modules 22. Accordingly, a first driver may have a first set of settings and, upon exiting of the first driver and entering of a second driver in the driver seat, the settings may automatically adjust when the vehicle 12 is stationary due to the detection of the various dimensional information corresponding to that particular occupant. Further, by providing a detection system 10 that is capable of tracking finger 150 and hand 148 motions/indication directions 158, more accurate gesture 162 determination may be employed. Further, by employing the present LiDAR modules 22 as opposed to other time-of-flight sensors and/or stereoscopic imagers, privacy information may be limited and still provide the various comfort and/or ergonomic enhancements for the present disclosure. By using the present time-of-flight sensors 16 as opposed to stereoscopic imagers that require edge detection and shape estimation, the depth information is provided automatically via the at least one point cloud 24 to thereby reduce computational load and/or increase power consumption efficiency.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A method for managing occupant interaction with components of a vehicle, the method comprising:
   generating, via a time-of-flight sensor, a point cloud representing a compartment of the vehicle, the point cloud including three-dimensional positional information about the compartment;
   identifying at least one body segment of a user based on the point cloud;
   determining, via processing circuitry in communication with the time-of-flight sensor, a position of at least one feature of the at least one body segment;
   calculating an orientation of the at least one body segment based on the at least one feature;
   estimating an intended task of the user based on the orientation of the at least one body segment; and
   generating, via the processing circuitry, a response signal in response to estimation of the intended task.

2. The method of claim 1, wherein the at least one body segment includes a head, the at least one feature is a facial feature, the orientation is a tilt of the head, and the intended task is a gaze direction of the user, the method further comprising:
   calculating the tilt of the head based on the facial feature; and
   estimating the gaze direction based on the tilt of the head.

3. The method of claim 2, further comprising:
   identifying, based on the point cloud, eyes of the user;
   calculating a frontal plane based on the eyes of the user; and
   determining a vector normal to the frontal plane, wherein the vector corresponds to the estimation of the gaze direction.

4. The method of claim 3, further comprising:
   communicating, via the processing circuitry, a signal to align an adjustable component of the vehicle based on the estimation of the gaze direction.

5. The method of claim 4, wherein the adjustable component is configured to adjust a visual feedback element.

6. The method of claim 5, wherein the visual feedback element is a display, and wherein the adjustable component is configured to adjust a visual presentation of the display to align the display with the estimation of the gaze direction.

7. The method of claim 5, wherein the visual feedback element is a mirror, and wherein the adjustable component is configured to adjust an angle of the mirror to align the mirror with a target viewing angle.

8. The method of claim 4, wherein the adjustable component is configured to adjust a position of the user.

9. The method of claim 1, wherein the at least one body segment includes an appendage, the at least one feature is a longitudinal extension, the orientation is an indication direction, and the intended task is an input selection of the user, the method further comprising:
   calculating the indication direction of the appendage based on the longitudinal extension; and
   estimating the input selection based on the indication direction.

10. The method of claim 9, further comprising:
    predicting a system function of the vehicle to be adjusted based on the estimation of the input selection; and
    presenting an option to activate the system function.

11. The method of claim 10, further comprising:
    identifying, based on the point cloud, a gesture by the user; and selecting, via the processing circuitry, the option based on the gesture.

12. The method of claim 11, wherein the input selection is manipulation of a mechanical switch.

13. The method of claim 11, wherein the input selection is a digital indicator presented at a user interface for the vehicle.

14. The method of claim 13, further comprising:
communicating a signal to adjust a size of the digital indicator at the user interface based on the identification of the gesture.

15. A system for managing occupant interaction with components of a vehicle, the system comprising:
a time-of-flight sensor configured to generate a point cloud representing a compartment of the vehicle, the point cloud including three-dimensional positional information about the compartment; and
processing circuitry in communication with the time-of-flight sensor configured to:
identify at least one body segment of a user based on the point cloud;
determine a position of at least one feature of the at least one body segment;
calculate an orientation of the at least one body segment based on the at least one feature;
estimate an intended task of the user based on the orientation of the at least one body segment; and
generate a response signal in response to the estimation of the intended task.

16. The system of claim 15, wherein the at least one body segment includes a head, the at least one feature is a facial feature, the orientation is a tilt of the head, and the intended task is a gaze direction of the user, the processing circuitry further configured to:
calculate the tilt of the head based on the facial feature; and
estimate the gaze direction based on the tilt of the head.

17. The system of claim 16, further comprising:
an adjustable component of the vehicle in communication with the processing circuitry, the processing circuitry further configured to communicate a signal to align the adjustable component.

18. The system of claim 15, wherein the at least one body segment includes an appendage, the at least one feature is a longitudinal extension, the orientation is an indication direction, and the intended task is an input selection of the user, the processing circuitry further configured to:
calculate the indication direction of the appendage based on the longitudinal extension; and
estimate the input selection based on the indication direction.

19. The system of claim 18, wherein the processing circuitry is further configured to:
predict a system function of the vehicle to be adjusted based on the estimation of the input selection;
present an option to activate the system function;
identify, based on the point cloud, a gesture by the user; and
select the option based on the gesture.

20. A system for managing occupant interaction with components of a vehicle, the system comprising:
a time-of-flight sensor configured to generate a point cloud representing a compartment of the vehicle, the point cloud including three-dimensional positional information about the compartment;
a visual feedback element;
an adjustable component configured to adjust the visual feedback element; and
processing circuitry in communication with the time-of-flight sensor and the adjustable component, the processing circuitry configured to:
identify a head of a user based on the point cloud;
determine a position of facial features of the head;
calculate a tilt of the head based on the facial features;
estimate a gaze direction of the user based on the tilt; and
communicate a signal to align the adjustable component based on the estimation of the gaze direction.

* * * * *